(12) United States Patent
Land et al.

(10) Patent No.: US 10,761,658 B2
(45) Date of Patent: Sep. 1, 2020

(54) STORING BASELINE INFORMATION IN EEPROM

(71) Applicant: Apple Inc., Cupertino, CA (US)

(72) Inventors: Brian Richards Land, Woodside, CA (US); Wayne Carl Westerman, Burlingame, CA (US); Steve Porter Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 561 days.

(21) Appl. No.: 15/070,982

(22) Filed: Mar. 15, 2016

(65) Prior Publication Data
US 2016/0195964 A1 Jul. 7, 2016

Related U.S. Application Data

(60) Continuation of application No. 14/273,403, filed on May 8, 2014, now Pat. No. 9,310,912, which is a
(Continued)

(51) Int. Cl.
*G09G 5/00* (2006.01)
*G06F 3/044* (2006.01)
*G06F 3/041* (2006.01)

(52) U.S. Cl.
CPC .............. *G06F 3/044* (2013.01); *G06F 3/041* (2013.01); *G06F 3/0418* (2013.01); *G06F 2203/04104* (2013.01); *G06F 2203/04108* (2013.01)

(58) Field of Classification Search
CPC ...... G06F 3/041; G06F 3/044; G06F 3/03547; G06F 3/0412; G06F 3/048;
(Continued)

(56) References Cited

U.S. PATENT DOCUMENTS 5,283,559 A 2/1994 Kalendra et al.
5,376,948 A 12/1994 Roberts
(Continued)

FOREIGN PATENT DOCUMENTS

EP 0 870 223 A1 10/1998
EP 0 870 223 B1 10/1998
(Continued)

OTHER PUBLICATIONS

Final Office Action dated Jun. 8, 2011, for U.S. Appl. No. 11/650,037, filed Jan. 3, 2007, nine pages.
(Continued)

*Primary Examiner* — Jennifer T Nguyen
(74) *Attorney, Agent, or Firm* — Kubota & Basol LLP

(57) ABSTRACT

Pre-stored no-touch or no-hover (no-event) sensor output values can initially be used when a sensor panel subsystem is first booted up to establish an initial baseline of sensor output values unaffected by fingers or other objects touching or hovering over the sensor panel during boot-up. This initial baseline can then be normalized so that each sensor generates the same output value for a given amount of touch or hover, providing a uniform response across the sensor panel and enabling subsequent touch or hover events to be more easily detected. After the initial normalization process is complete, the pre-stored baseline can be discarded in favor of a newly captured no-event baseline that may be more accurate than the pre-stored baseline due to temperature or other variations.

28 Claims, 11 Drawing Sheets

Related U.S. Application Data continuation of application No. 13/708,675, filed on Dec. 7, 2012, now Pat. No. 8,736,577, which is a continuation of application No. 13/298,227, filed on Nov. 16, 2011, now Pat. No. 8,350,821, which is a continuation of application No. 12/890,274, filed on Sep. 24, 2010, now Pat. No. 8,077,160, which is a division of application No. 11/650,037, filed on Jan. 3, 2007, now Pat. No. 8,054,296.

(58) Field of Classification Search
CPC . G06F 2203/04108; G06F 2203/04104; G06F 3/0418
USPC .................................................. 345/173–178
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,583,676 B2 | 6/2003 | Krah et al. |
| 6,690,387 B2 | 2/2004 | Zimmerman et al. |
| 7,015,894 B2 | 3/2006 | Morohoshi |
| 7,176,897 B2 | 2/2007 | Roberts |
| 7,184,064 B2 | 2/2007 | Zimmerman et al. |
| 7,337,085 B2 | 2/2008 | Soss |
| 7,443,386 B2 | 10/2008 | Gao et al. |
| 7,663,607 B2 | 2/2010 | Hotelling et al. |
| 7,692,638 B2 | 4/2010 | Land et al. |
| 8,026,904 B2 | 9/2011 | Westerman |
| 8,054,296 B2 | 11/2011 | Land et al. |
| 8,077,160 B2 | 12/2011 | Land et al. |
| 8,350,821 B2 | 1/2013 | Land et al. |
| 8,479,122 B2 | 7/2013 | Hotelling et al. |
| 8,736,577 B2 | 5/2014 | Land et al. |
| 9,310,912 B2 * | 4/2016 | Land ............... G06F 3/0418 |
| 2003/0210235 A1 | 11/2003 | Roberts |
| 2005/0253817 A1 * | 11/2005 | Rytivaara ............ G06F 3/04883 345/173 |
| 2006/0026521 A1 | 2/2006 | Hotelling et al. |
| 2006/0197753 A1 | 9/2006 | Hotelling |
| 2006/0202969 A1 | 9/2006 | Hauck |
| 2006/0267953 A1 | 11/2006 | Peterson et al. |
| 2006/0293864 A1 | 12/2006 | Soss |
| 2007/0070049 A1 * | 3/2007 | Lee .................. G06F 3/044 345/173 |
| 2007/0229466 A1 | 10/2007 | Peng et al. |
| 2007/0257890 A1 | 11/2007 | Hotelling et al. |
| 2008/0012835 A1 | 1/2008 | Rimon et al. |
| 2008/0036742 A1 | 2/2008 | Garmon |
| 2008/0047764 A1 * | 2/2008 | Lee .................. G08C 21/00 178/18.06 |
| 2008/0158172 A1 | 7/2008 | Hotelling et al. |
| 2008/0158182 A1 | 7/2008 | Westerman |
| 2011/0015889 A1 | 1/2011 | Land et al. |
| 2012/0062493 A1 | 3/2012 | Land et al. |
| 2014/0240271 A1 | 8/2014 | Land et al. |

FOREIGN PATENT DOCUMENTS

| | | |
|---|---|---|
| EP | 1 717 677 A2 | 11/2006 |
| EP | 1 717 677 A3 | 11/2006 |
| JP | 2000-163031 A | 6/2000 |
| JP | 2002-342033 A | 11/2002 |
| WO | WO-2008/085413 A2 | 7/2008 |
| WO | WO-2008/085413 A3 | 7/2008 |

OTHER PUBLICATIONS

International Search Report dated Jul. 16, 2008 for PCT Application No. PCT/US2007/026171, filed Dec. 21, 2007, two pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Jun. 22, 2010, for U.S. Appl. No. 11/650,112, filed Jan. 3, 2007, six pages.
Non-Final Office Action dated Dec. 13, 2010, for U.S. Appl. No. 11/650,037, filed Jan. 3, 2007, eight pages.
Non-Final Office Action dated Dec. 23, 2010, for U.S. Appl. No. 11/650,112, filed Jan. 3, 2007, four pages.
Non-Final Office Action dated Mar. 22, 2012, for U.S. Appl. No. 13/298,227, filed Nov. 16, 2011, seven pages.
Non-Final Office Action dated Jul. 5, 2013, for U.S. Appl. No. 13/708,675, filed Dec. 7, 2013, six pages.
Non-Final Office Action dated Jul. 2, 2015, for U.S. Appl. No. 14/273,403, filed May 8, 2014, ten pages.
Notice of Allowance dated Jun. 1, 2011, for U.S. Appl. No. 11/650,112, filed Jan. 3, 2007, five pages.
Notice of Allowance dated Jun. 27, 2011, for U.S. Appl. No. 12/890,274, filed Sep. 24, 2010, eight pages.
Notice of Allowance dated Oct. 3, 2011, for U.S. Appl. No. 12/890,274, filed Sep. 24, 2010, eight pages.
Notice of Allowance dated Sep. 18, 2012, for U.S. Appl. No. 13/298,227, filed Nov. 16, 2011, nine pages.
Notice of Allowance dated Feb. 11, 2014, for U.S. Appl. No. 13/708,675, filed Dec. 7, 2012, five pages.
Notice of Allowance dated Dec. 16, 2015, for U.S. Appl. No. 14/273,403, filed May 8, 2014, five pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

STORING BASELINE INFORMATION IN EEPROM

CROSS REFERENCES TO RELATED APPLICATIONS

This application is a continuation of U.S. patent application Ser. No. 14/273,403, filed May 8, 2014 and published on Aug. 28, 2014 as U.S. Publication No. 2014-0240271; which is a continuation of U.S. patent application Ser. No. 13/708,675, filed Dec. 7, 2012 and issued on May 27, 2014 as U.S. Pat. No. 8,736,577; which is a continuation of U.S. patent application Ser. No. 13/298,227, filed Nov. 16, 2011 and issued on Jan. 8, 2013 as U.S. Pat. No. 8,350,821; which is a continuation of U.S. patent application Ser. No. 12/890,274, filed Sep. 24, 2010 and issued on Dec. 13, 2011 as U.S. Pat. No. 8,077,160; which is a divisional of U.S. patent application Ser. No. 11/650,037, filed Jan. 3, 2007 and issued on Nov. 8, 2011 as U.S. Pat. No. 8,054,296, the contents of which are incorporated by references herein in their entirety for all purposes.

FIELD OF THE INVENTION

This relates to panels used as input devices for computing systems, and more particularly, to the pre-storing of baseline no-touch sensor output values in nonvolatile memory for use during boot-up so that the baseline is not corrupted by fingers or other objects touching the sensor panel during boot-up.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Future panels may be able to detect multiple touches (the touching of fingers or other objects upon a touch-sensitive surface at distinct locations at about the same time) and near touches (fingers or other objects within the near-field detection capabilities of their touch sensors), and identify and track their locations. Examples of multi-touch panels are described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Proximity sensor panels are another type of input device that can include an array of proximity sensors capable of detecting hover events (the no-touch, close proximity hovering of fingers or other objects above a surface but outside the near-field detection capabilities of touch sensors) as well as touch events. Proximity sensor panels may also be able to detect multiple instances of hovering referred to herein as multi-hover events (the hovering of fingers or other objects above a surface at distinct locations at about the same time). Examples of a proximity sensor, a proximity sensor panel, a multi-hover panel and a computing system using both a multi-touch panel and proximity sensors are described in Applicant's co-pending U.S. Patent Application Publication No. 2008/0158172 entitled "Proximity and Multi-Touch Sensor Detection and Demodulation," filed on Jan. 3, 2007, the contents of which are incorporated by reference herein.

Proximity sensor panels can be employed either alone or in combination with multi-touch panels. In addition, it is noted that some touch sensors, particularly capacitive touch sensors, can detect some hovering or proximity. Proximity sensors, as referred to herein, are understood to be distinct from touch sensors, including touch sensors that have some ability to detect proximity. Multi-touch sensor panels capable of detecting multi-touch events and multi-hover sensor panels capable of detecting multi-hover events may collectively be referred to herein as multi-event sensor panels.

Both touch sensor panels and proximity sensor panels can be formed as an array of rows and columns of sensors. To scan a sensor panel, a stimulus can be applied to one row with all other rows held at DC voltage levels, although it is possible to drive a group of rows simultaneously and derive the results for each row. When a row is stimulated, a modulated output signal can appear on the columns of the sensor panel. The columns can be connected to analog channels (also referred to herein as event detection and demodulation circuits) that may be implemented using analog and/or digital circuits. For every row that is stimulated, each analog channel connected to a column generates an output value representative of an amount of change in the modulated output signal due to a touch or hover event occurring at the sensor located at the intersection of the stimulated row and the connected column. After analog channel output values are obtained for every column in the sensor panel, a new row is stimulated (with all other rows once again held at DC voltage levels), and additional analog channel output values are obtained. When all rows have been stimulated and analog channel output values have been obtained, the sensor panel is said to have been "scanned," and a complete "image" of touch or hover can be obtained over the entire sensor panel. This image of touch or hover can include an analog channel output value for every pixel (row and column) in the panel, each output value representative of the amount of touch or hover that was detected at that particular location.

Thus, for example, if a finger touched down directly in the center of a touch panel, the resultant image of touch would include analog channel output values for the pixels located near the center of the panel indicative of touch events occurring at those pixels. The pixels with these output values might be generally grouped together in a oval or ellipsoidal, fingerprint-shaped cluster. Furthermore, the pixels in the center of that oval can have output values indicative of a greater of degree of touch than those pixels at the outside edges of the oval. A similar image of hover can be captured for a finger hovering over the center of the panel.

As mentioned above, a display screen can be located beneath the sensor panel or integrated with the sensor panel. A user interface (UI) algorithm can generate a virtual keypad or other virtual input interface beneath the sensor panel that can include virtual buttons, pull-down menus and the like.

By detecting touch or hover events at locations defined by the virtual buttons, the UI algorithm can determine that a virtual button has been "pushed." The magnitude of the analog channel output values, indicating the "degree" of touch or hover, can be used by the UI algorithm to determine whether there was a sufficient amount of touch or hover to trigger the pushing of the virtual button.

Ideally, a particular amount of touch or hover should generate an analog channel output value of the same magnitude, and thus trigger a corresponding virtual button at the same level or amount of touch or hover, regardless of where the touch or hover event occurred on a sensor panel. However, the electrical characteristics of the sensors in a sensor panel are likely to vary due to processing variations, manufacturing tolerances and assembly differences (which can be due to the location of the sensors in relation to the edges and shape of the sensor panel). For example, variations in the etching pattern for the ITO, variations in the dielectric constant of the glass substrate, the presence of microbubbles in the laminated stackup of materials that form the sensor panel, routing differences in traces on the panel and flex circuits connecting to the panel, or differences in the dielectric constant of the cover plastic, can affect the magnitude of the analog channel output values from location to location within the sensor panel. This can lead to false triggering of virtual buttons or non-triggering of virtual buttons, and a difficult user experience as the user discovers that certain areas of the sensor panel require more or less touching, or closer or farther hovering in order to trigger a virtual button.

To provide a more uniform response from the sensor panel given the same amount of touch or hover, the sensor panel can be calibrated or normalized during boot-up of the computing device that uses the sensor panel. This calibration process can involve scanning the entire sensor panel to determine raw baseline (no-touch or no-hover) output values for each sensor in the panel, and then subtracting out differences in the output values so that all sensor output values are normalized to approximately the same value. With a normalized baseline, subsequent touch or hover events can be more easily detected as increases in output values as compared to the normalized no-touch or no-hover output values, and the same amount of touch or hover at any location in the sensor panel is more likely to consistently trigger a corresponding virtual button.

However, this normalization process presumes that there are no fingers or other objects touching or hovering above the surface of the sensor panel when the raw baseline output values are first obtained. If a user, for example, powers up an electronic device while the user's finger was touching or hovering above the sensor panel, the raw baseline output values for the sensors at which a touch or hover event is detected will be higher than if no finger was present. The higher raw baseline output values for those sensors will be incorrectly interpreted as no-touch or no-hover output values, and the normalization process will generate erroneous normalized baseline values for those sensors.

SUMMARY OF THE INVENTION

Pre-stored no-touch or no-hover (no-event) sensor output values can initially be used when a sensor panel subsystem is first booted up to establish an initial baseline of sensor output values unaffected by fingers or other objects touching or hovering over the sensor panel during boot-up. This initial baseline can then be normalized so that each sensor generates the same output value for a given amount of touch or hover, providing a uniform response across the sensor panel and enabling subsequent touch or hover events to be more easily detected. After the initial normalization process is complete, the pre-stored baseline can be discarded in favor of a newly captured no-event baseline that may be more accurate than the pre-stored baseline due to temperature or other variations.

To implement this baseline normalization procedure, the raw no-event baseline values for the sensor panel can be captured prior to final assembly, such as at the factory, for example, and stored in non-volatile memory such as an EEPROM. During boot-up, rather than scanning the sensor panel for the raw baseline, the pre-stored raw baseline, unaffected by any finger or object that may be present, can be used. Offsets can then be computed so that they can be applied to subsequently received output values (after boot-up is complete) to generate normalized output values. A scan of the sensor panel to obtain raw sensor output values can then be performed. A finger or other object can then be detected because the raw sensor output values will be higher than the pre-stored raw baseline. Alternatively, it can be determined that there is no finger of other object present due to the appearance of relatively flat raw output values (within a predetermined range of each other), or if the output values are below some predetermined threshold or within some predetermined range of the pre-stored raw baseline. If a finger or other object is in fact detected, no new baseline will be captured until the finger or other object has been removed, and the values appear flat and/or fall below the threshold or within the predetermined range of the pre-stored raw baseline. In some embodiments of the invention, the detection of a finger or other object can be used to initiate diagnostics modes that run internal tests on the device, or put the device into a certain operational mode. When it has been determined that no finger or other object is present, a new scan of the sensor panel can be performed, a new baseline can be obtained and the pre-stored raw baseline can be discarded.

In some embodiments of the invention when a pre-stored raw baseline is not employed as described above, a global baseline inversion detection algorithm may be performed instead. This algorithm is based on the empirical observation that if a large object such as a palm is placed on a sensor panel, the sensor output values underneath the large object will increase as expected, but just outside the object, where there is no touching or hovering, the sensor output values will unexpectedly decrease. If a conventional "minimum increment baseline adaptation" process is used to dynamically maintain a revised baseline using the lowest sensor output values obtained, the raw baseline values for the outside sensors will be artificially lowered, and an inaccurate revised baseline will be generated.

The global baseline inversion detection algorithm, which is executed during boot-up, can eliminate the capture of an inaccurate baseline as described above. A scan of the entire sensor panel is first performed and a baseline is captured. Next, the number of sensor output values in the entire image with values above the current normalized baseline value are summed (above_baseline_sum), and the number of sensor output values below the normalized baseline are summed (below_baseline_sum). A determination is made whether the magnitude of below_baseline_sum is much greater than (>>) the magnitude of above_baseline_sum (greater than a predetermined margin) for several frames. If this condition is not satisfied, the sensor panel is re-scanned and the sums above_baseline_sum and below_baseline_sum are re-computed. The baseline is recaptured only when the magnitude of below_baseline_sum is >> magnitude of above_baseline_sum, and this condition persists for several consecutive frames.

When a palm or other large object is present, the captured sensor output values will be high for the sensors underneath the large object and low for the outside sensors, and an erroneous baseline will be captured. As long as the palm or other large object is present, because the erroneous baseline is being used, the values for above_baseline_sum and below_baseline_sum will both be small, the magnitude of below_baseline_sum will not be much greater than the magnitude of above_baseline_sum, and no new baseline will be captured. As a result, the baseline values for the sensors outside the large object will not be pushed down to an artificially low level. When the palm or other large object is removed, all output values will return to the correct baseline. In other words, the output values for the sensors that were underneath the large object will drop, and the output values for the sensors outside the large object should rise. However, because that the captured erroneous baseline is still being used, the magnitude of below_baseline_sum will be much greater than the magnitude of above_baseline_sum. If this condition persists for a few scans, the algorithm concludes that the palm or other large object has definitively been removed, and a new baseline can be captured.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be used and structural changes may be made without departing from the scope of the preferred embodiments of the present invention.

Pre-stored no-touch or no-hover (no-event) sensor output values can initially be used when a sensor panel subsystem is first booted up to establish an initial baseline of sensor output values unaffected by fingers or other objects touching or hovering over the sensor panel during boot-up. This initial baseline can then be normalized so that each sensor generates the same output value for a given amount of touch or hover, providing a uniform response across the sensor panel and enabling subsequent touch or hover events to be more easily detected. After the initial normalization process is complete, the pre-stored baseline can be discarded in favor of a newly captured no-event baseline that may be more accurate than the pre-stored baseline due to temperature or other variations.

Although some embodiments of the invention may be described herein in terms of the normalization of capacitive multi-touch sensor panels, embodiments of the invention may be generally applicable to other types of multi-touch sensors that can include resistive touch sensors, surface acoustic wave touch sensors, electromagnetic touch sensors, near field imaging touch sensors, optical touch sensors and the like. In addition, although the proximity sensors may be described herein as infrared (IR) proximity sensors, embodiments of the invention may be generally applicable to other types of proximity sensors having an output that can be AC-coupled to an analog channel.

Figure 1:
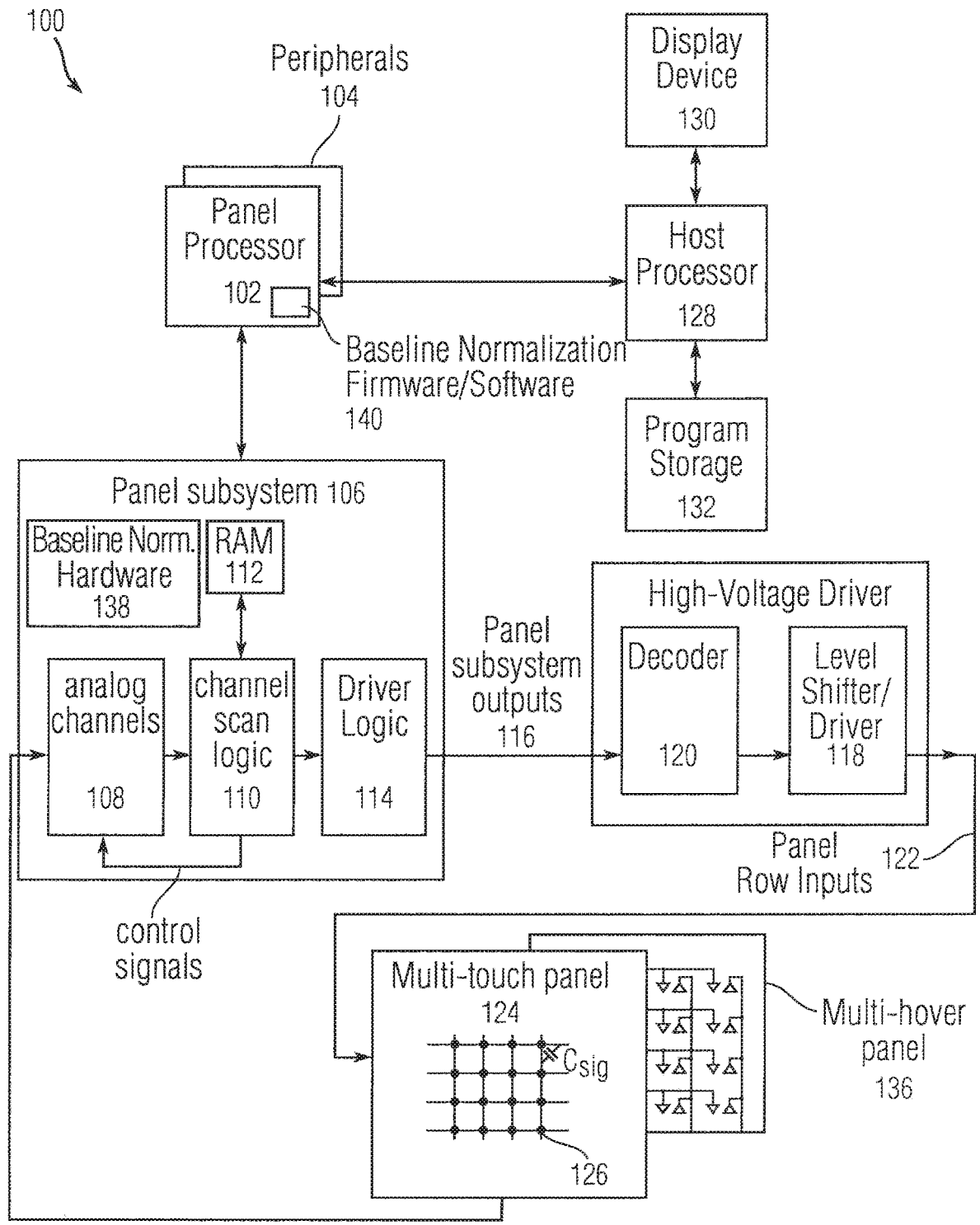
FIG. 1 is an illustration of an exemplary computing system operable with either a multi-touch panel, a multi-hover panel, or a combination of both according to one embodiment of this invention.

Multi-touch touch-sensitive panels may be able to detect multiple touches (touch events or contact points) that occur at about the same time, and identify and track their locations. Similarly, multi-hover hover-sensitive panels may be able to detect multiple occurrences of hovering (hover events) that occur at about the same time, and identify and track their locations. FIG. 1 illustrates exemplary computing system 100 operable with either multi-touch panel 124, multi-hover panel 136, or a combination of both. Computing system 100 can include one or more panel processors 102 and peripherals 104, and panel subsystem 106. The one or more processors 102 can include, for example, ARM968 processors or other processors with similar functionality and capabilities. However, in other embodiments, the panel processor functionality can be implemented instead by dedicated logic such as a state machine. Peripherals 104 can include, but are not limited to, random access memory (RAM) or other types of memory or storage, watchdog timers and the like.

Panel subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 or multi-hover panel 136 to analog channels 108. In addition, channel scan logic 110 can control the driver logic and stimulation signals being selectively applied to rows of multi-touch panel 124 or multi-hover panel 136. Compensation hardware 138 in panel subsystem 106, UI algorithm 140 in software or firmware executed by panel processor 102 and/or channel scan logic 110 (which may be referred to collectively herein as simply UI logic) can be used to perform the sensor panel compensation according to embodiments of the invention. In some embodiments, panel subsystem 106, panel processor 102 and peripherals 104 can be integrated into a single application specific integrated circuit (ASIC).

Driver logic 114 can provide multiple panel subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and panel 124. Each panel row input 122 can drive one or more rows in panel 124. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as a liquid crystal display (LCD) for providing a UI to a user of the device.

Multi-touch panel 124 can in some embodiments include a capacitive sensing medium having a plurality of row traces or driving lines and a plurality of column traces or sensing lines, although other sensing media may also be used. The row and column traces can be formed from a transparent conductive medium such as Indium Tin Oxide (no) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-orthogonal or non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in other embodiments, the rows and columns can be formed on a single side of a substrate, or can be formed on two separate substrates separated by a dielectric material. In some embodiments, the dielectric material can be transparent, such as glass, or can be formed from other materials such as Mylar. An additional dielectric cover layer may be placed over the row or column traces to strengthen the structure and protect the entire assembly from damage.

At the "intersections" of the traces, where the traces pass above and below (i.e. cross) each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after multi-touch subsystem 106 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 108 (also referred to herein as event detection and demodulation circuits) in multi-touch subsystem 106. In some embodiments, each column is coupled to one dedicated analog channel 108. However, in other embodiments, the columns may be couplable via an analog switch to a fewer number of analog channels 108.

Figure 2A:
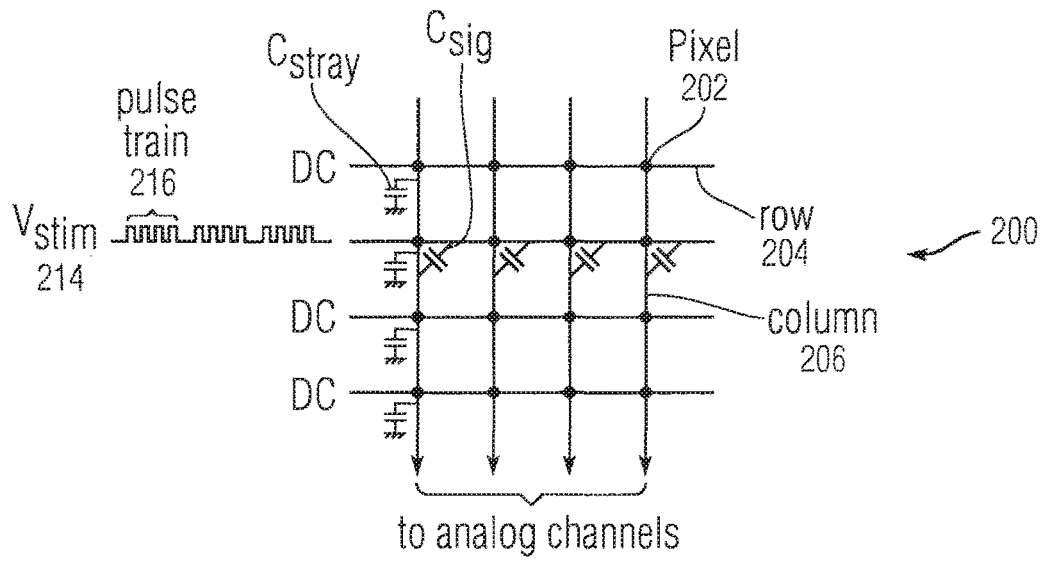
FIG. 2a illustrates an exemplary capacitive multi-touch panel according to one embodiment of this invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstm. Each of columns 206 may be selectively connectable to one or more analog channels (see analog channels 108 in FIG. 1).

Figure 2B:
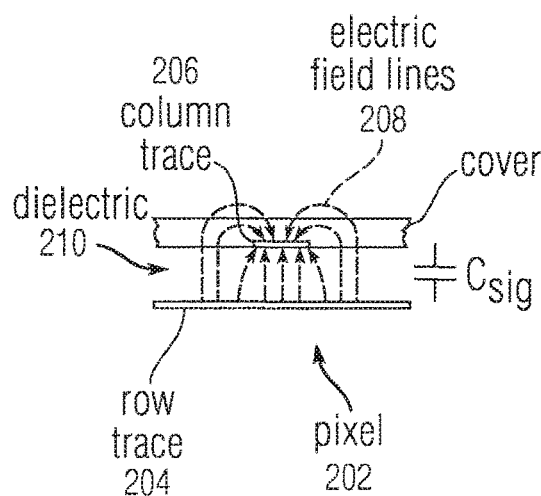
FIG. 2b is a side view of an exemplary pixel in a steady-state (no-touch) condition according to one embodiment of this invention.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 is shown.

Figure 2C:
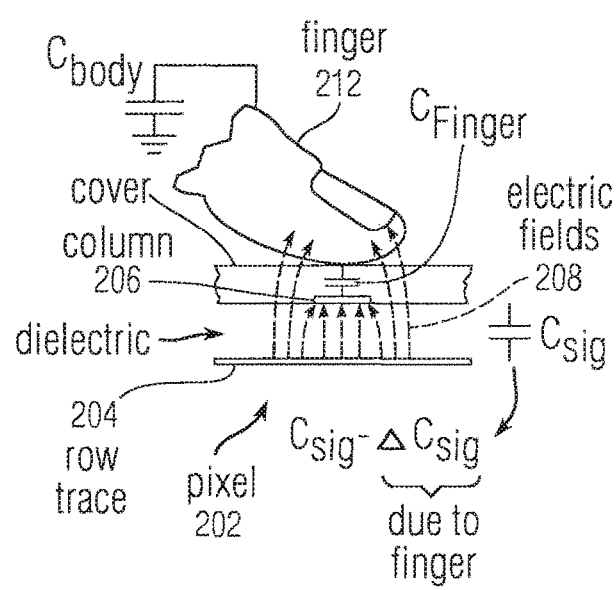
FIG. 2c is a side view of an exemplary pixel in a dynamic (touch) condition according to one embodiment of this invention.

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 206 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can include one or more pulse trains 216 at a particular frequency, with each pulse train including a number of pulses. Although pulse trains 216 are shown as square waves, other waveshapes such as sine waves can also be employed. A plurality of pulse trains 216 at different frequencies can be transmitted for noise reduction purposes to detect and avoid noisy frequencies. Vstim signal 214 essentially injects a charge into the row, and can be applied to one row of multi-touch panel 200 at a time while all other rows are held at a DC level. However, in other embodiments, the multi-touch panel may be divided into two or more sections, with Vstim signal 214 being simultaneously applied to one row in each section and all other rows in that region section held at a DC voltage.

Each analog channel coupled to a column measures the mutual capacitance formed between that column and the row. This mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

Figure 3:
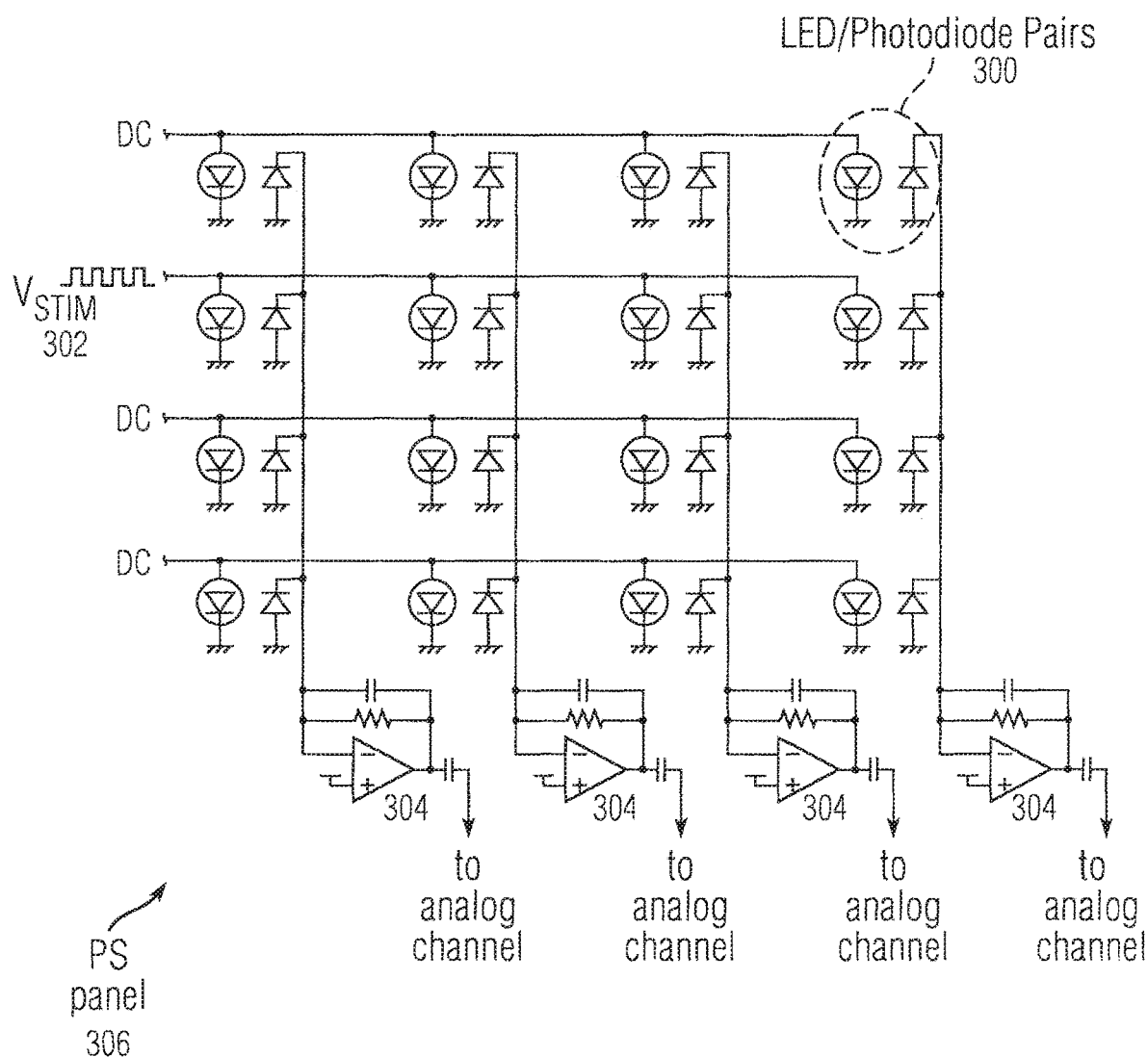
FIG. 3 illustrates an exemplary proximity sensor panel that can include an array of LED/photodiode pairs, each pair representing a portion of a proximity sensor, according to one embodiment of this invention.

FIG. 3 illustrates an exemplary proximity sensor panel 306 that can include an array of LED/photodiode pairs 300, each pair representing a portion of a proximity sensor, according to some embodiments of the invention. In FIG. 3, each LED/photodiode pair 300 in a particular row can be simultaneously stimulated by Vstim 302 with the other rows held at a DC voltage, and after a snapshot of the row has been captured, LED/photodiode pairs 300 in a new row can be stimulated. In the first two columns of FIG. 3, each LED/photodiode pair 300 in a particular column can be simultaneously connected to a single photodiode amplifier 304, and each photodiode amplifier 304 can be connected to a separate analog channel of the same design that can be used to detect changes in signal capacitance in a capacitive touch sensor array. In this manner, for every row being stimulated, the analog channels for each column can determine, at about the same time, whether the LED/photodiode pair in the row being stimulated has detected the presence of a finger, palm or other object. Eventually, if Vstim has been applied to all rows, and the effect of any photodiode current on all columns in all rows has been captured (i.e. the entire proximity sensor panel 306 has been "scanned"), a "snapshot" of all pixel values can be obtained for the entire panel. This snapshot data can be initially saved in the panel subsystem, and later transferred out for interpretation by other devices in the computing system such as the host processor. As multiple snapshots are obtained, saved and interpreted by the computing system, it is possible for multiple hover events to be detected, tracked, and used to perform other functions.

Figure 4:
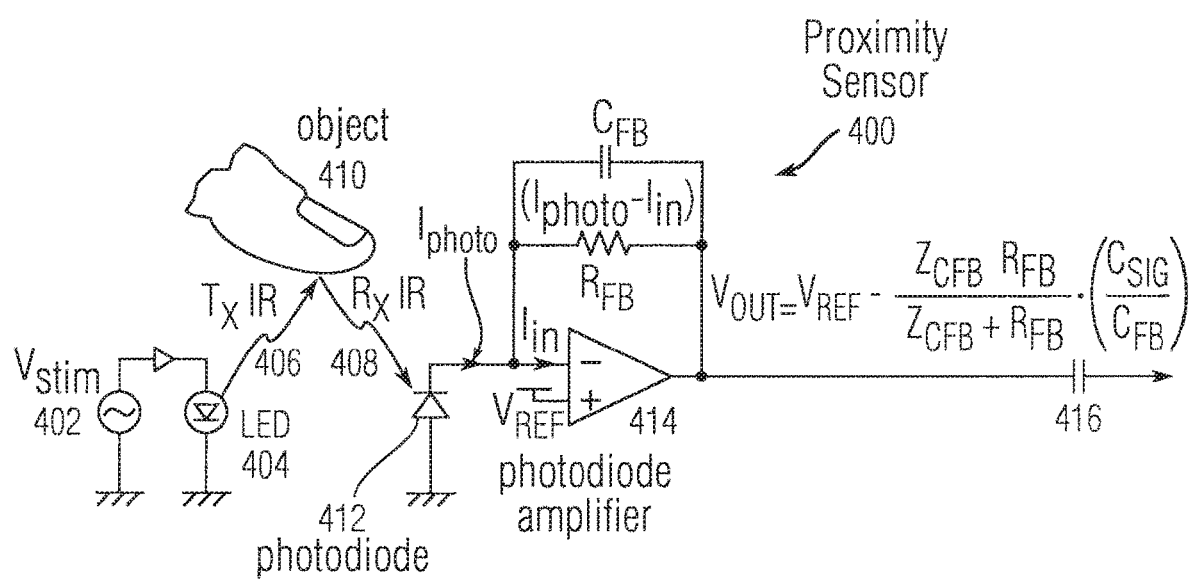
FIG. 4 is an illustration of an exemplary proximity sensor according to one embodiment of this invention.

FIG. 4 is an illustration of exemplary proximity sensor 400 according to some embodiments of this invention. Proximity sensors 400 can detect one or more fingers, a palm or other object touching the multi-touch panel or hovering over the multi-touch panel in the far field without touching it. Proximity sensor 400 can include source Vstim 402 that drives IR light emitting diode (LED) 404, which emits transmitted IR 406. Vstim 402 can include a burst of square waves in an otherwise DC signal, in a manner similar to the Vstim applied to the rows on the capacitive multi-touch panel as described above, although in some embodiments the square waves representing Vstim can be preceded and followed by other non-DC signaling. Reflected IR 408, which may have reflected off of a finger, palm or other object 410, can be detected by photodiode (e.g. a fast pin diode) 412 or any other device (e.g. a phototransistor or other sensing device) whose current changes as a function of received IR light. Photodiode 412 can be reversed biased to a reference voltage Vref, which can be maintained at the − input (inverting input) of photodiode amplifier 414 whose + input (non-inverting input) is tied to Vref. The photocurrent produced through the photodiode, Iphoto, also primarily passes through the parallel combination of feedback resistor Rfb and capacitor Cfb, and the output of the photodiode amplifier is Vref−(Zcfb×Rfb)×(Iphoto+Iin)/(Zcfb+Rfb), the latter term (Zcfb×Rfb)×(Iphoto+Iin)/(Zcfb+Rfb), representing the voltage drop across Rfb and Cfb where Iin is the input current to the inverting input of photodiode amplifier 414 and is usually negligible. The impedance Zcfb is frequency dependent and can be adjusted to optimize the gain of the photo amplifier for a given modulation frequency of the signal Iphoto, whereas Iphoto(t)=Ip×sin (wt) with wt=2× PI×fmod and fmod is the modulation signal, Ip is the amplitude of the modulation signal and Zcfb=−1/(jwt). The modulation frequency fmod is equivalent to the modulation frequency fstm of Vstm. The output of photodiode amplifier 414 can be AC coupled using AC coupling capacitor 416.

Figure 5:
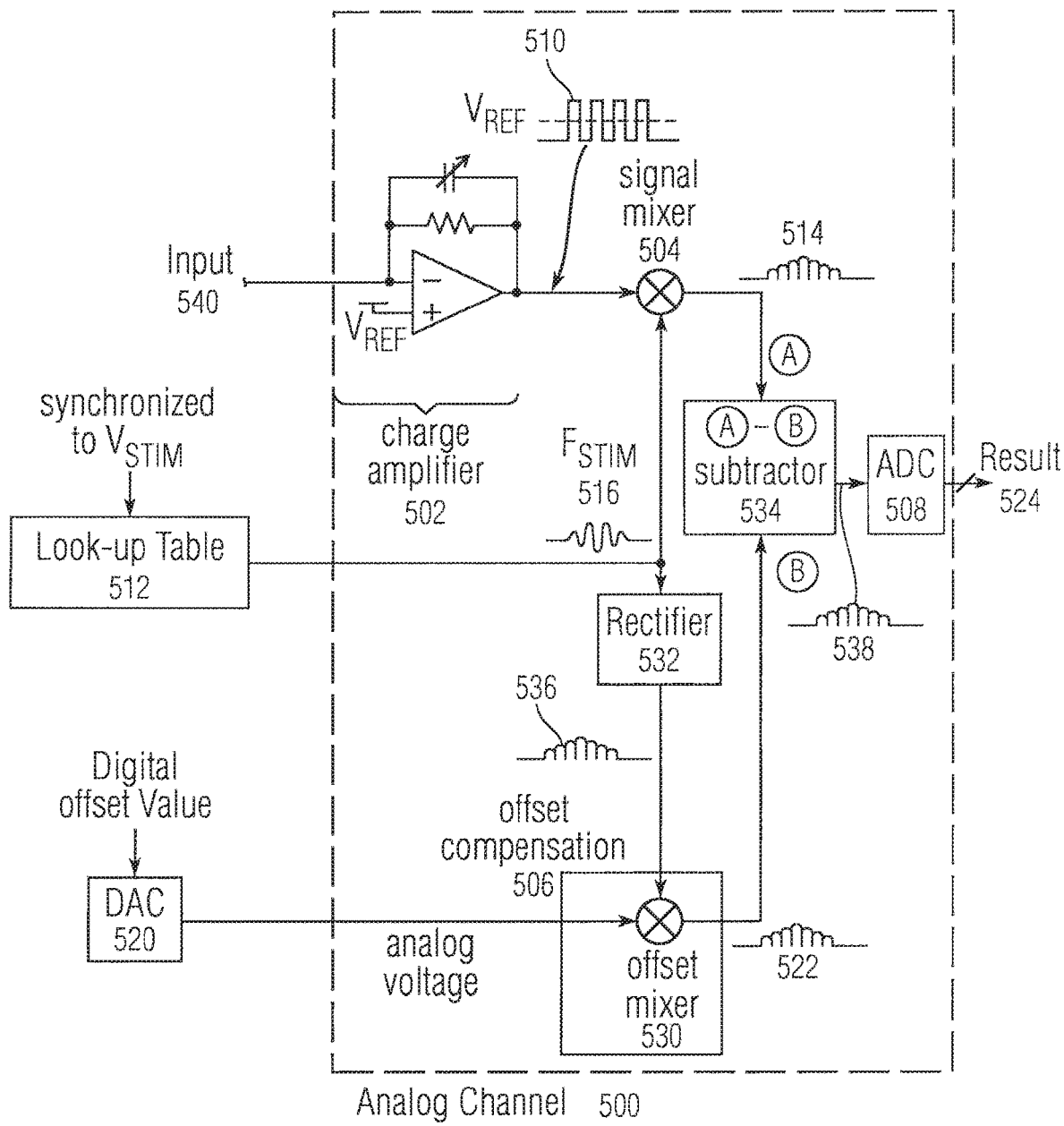
FIG. 5 illustrates exemplary analog channel (event detection and demodulation circuit) according to one embodiment of this invention.

FIG. 5 illustrates exemplary analog channel (event detection and demodulation circuit) 500. One or more analog channels 500 can be present in the panel subsystem. One or more columns from a multi-touch panel or a multi-hover panel can be connectable to input 540 of each analog channel 500. Each analog channel 500 can include virtual-ground charge amplifier 502, signal mixer 504, offset compensation 506, rectifier 532, subtractor 534, and analog-to-digital converter (ADC) 508. FIG. 5 also shows, in dashed lines, the steady-state signal capacitance Csig that can be contributed by a multi-touch panel column connected to analog channel 500 when an input stimulus Vstim is applied to a row in the multi-touch panel and no finger, palm or other object is present, and the dynamic signal capacitance Csig−ΔCsig that can appear when a finger, palm or other object is present.

Vstim, as applied to a row in the multi-touch panel, can be generated as a burst of square waves or other non-DC signaling in an otherwise DC signal, although in some embodiments the square waves representing Vstim can be preceded and followed by other non-DC signaling. If Vstim is applied to a row and a signal capacitance is present at a column connected to analog channel 500, the output of charge amplifier 502 can be pulse train 510 centered at Vref with a peak-to-peak (p-p) amplitude in the steady-state condition that is a fraction of the p-p amplitude of Vstim, the fraction corresponding to the gain of charge amplifier 502. For example, if Vstim includes 18V p-p pulses and the gain of the charge amplifier is 0.1, then the output of the charge amplifier can be 1.8V p-p pulses. This output can be mixed in signal mixer 504 with demodulation waveform Fstim 516.

Because Vstim can create undesirable harmonics, especially if formed from square waves, demodulation waveform Fstim 516 can be a Gaussian sine wave in an otherwise DC signal that is digitally generated from look-up table (LUT) 512 or other digital logic and synchronized to Vstim. In some embodiments, Fstim 516 can be tunable in frequency and amplitude by selecting different digital waveforms in LUT 512 or generating the waveforms differently using other digital logic. Signal mixer 504 can demodulate the output of charge amplifier 510 by subtracting Fstim 516 from the output to provide better noise rejection. Signal mixer 504 can reject all frequencies outside the passband, which can in one example be about +/−30 kHz around Fstim. This noise rejection can be beneficial in noisy environment with many sources of noise, such as 802.11, Bluetooth and the like, all having some characteristic frequency that can interfere with the sensitive (femtofarad level) analog channel 500. Signal mixer 504 is essentially a synchronous rectifier as the frequency of the signal at its inputs is the same, and as a result, signal mixer output 514 can be a rectified Gaussian sine wave.

Offset compensation 506 can then be applied to signal mixer output 514, which can remove the effect of the static Csig, leaving only the effect of ΔCsig appearing as result 524. Offset compensation 506 can be implemented using offset mixer 530. Offset compensation output 522 can be generated by rectifying Fstim 516 using rectifier 532, and mixing the rectifier output 536 with an analog voltage from digital-to-analog converter (DAC) 520 in offset mixer 530. DAC 520 can generate the analog voltage based on a digital value selected to increase the dynamic range of analog channel 500. Offset compensation output 522, which can be proportional to the analog voltage from the DAC 520, can then be subtracted from signal mixer output 514 using subtractor 534, producing subtractor output 538 which can be representative of the change in the AC capacitance ΔCsig that occurs when a capacitive sensor on the row being stimulated has been touched. Subtractor output 538 is then integrated and can then be converted to a digital value by ADC 508. In some embodiments, integrator and ADC functions are combined and ADC 508 may be an integrating ADC, such as a sigma-delta ADC, which can sum a number of consecutive digital values and average them to generate result 524.

Figure 6A:
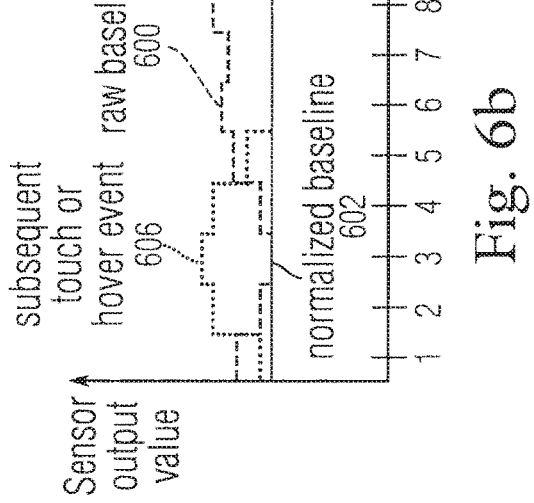
FIG. 6a is a graph of an exemplary sensor panel cross-section for one row of sensors versus sensor output value, showing the raw baseline obtained and the effect of a subsequent event according to one embodiment of this invention.

FIG. 6a is a graph of an exemplary sensor panel cross-section for one row of sensors versus sensor output value, with solid line 600 representing raw baseline no-event sensor values obtained after scanning the row during boot-up of a sensor panel subsystem and capturing the output values from the analog channels connected to the columns of the sensor panel. (It should be understood that a single row is illustrated for purposes of explanation only, but that similar graphs can be generated for every row in the sensor panel.) As mentioned above, the electrical characteristics of the sensors (pixels) in a sensor panel are likely to vary due to processing variations, manufacturing tolerances and assembly differences, resulting in variations in the sensor output values as generated by the analog channels. Accordingly, in the example of FIG. 6a, raw baseline no-event sensor values 600 vary from sensor to sensor across the row due to these variations. Because the raw baseline is non-uniform, a subsequent touch or hover event (after boot-up is complete) that occurs at or above the row can produce sensor output values 604 that do not stand out appreciably from raw baseline 600, and therefore can be difficult to detect.

Figure 6B:
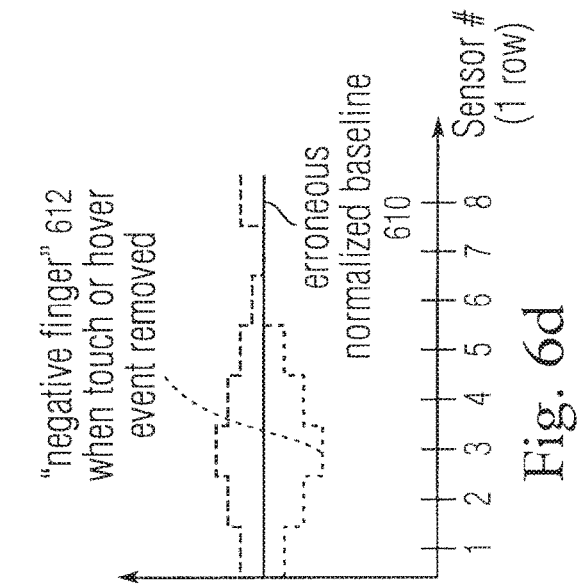
FIG. 6b is a graph of an exemplary sensor panel cross-section for one row of sensors versus sensor output value, showing the normalized baseline obtained and the effect of a subsequent event according to one embodiment of this invention.

To normalize the sensors, the difference (offset) between raw baseline no-event sensor value 600 and a selected normalized value for each sensor or pixel can be computed after the boot-up scan. These offsets (one for each sensor) can then be subtracted from all subsequently obtained output values for that sensor (after boot-up is complete) to normalize the sensor output values. In the example of FIG. 6b, the lowest raw baseline value (from sensor 3 in the example of FIG. 6a) has been chosen as normalized value 602, and thus the offsets for each sensor are computed based on this normalized value. However, it should be understood that any normalized value can be selected. For example, if these offsets are subtracted from the raw baseline values, all sensor output values will be adjusted to approximately normalized value 602, producing a substantially flat normalized response. With the offsets computed for each sensor, the same subsequent touch or hover event as shown in FIG. 6a will now produce normalized sensor output values 606 that stand out more appreciably from the normalized baseline 602, making it easier to detect.

Figure 6C:
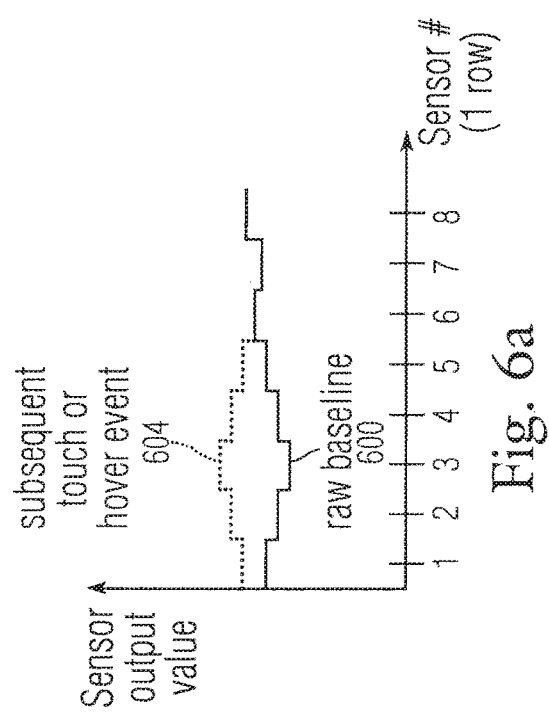
FIG. 6c is a graph of an exemplary sensor panel cross-section for one row of sensors versus sensor output value, showing the raw baseline obtained in error when an object is present at the sensor panel.
Figure 6D:
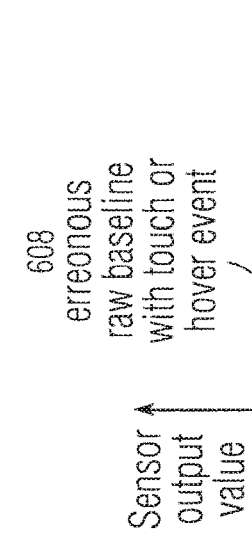
FIG. 6d is a graph of an exemplary sensor panel cross-section for one row of sensors versus sensor output value, showing an erroneous normalized baseline obtained and the effect of a subsequent event.

The examples of FIGS. 6*a* and 6*b* presume that no finger or other object was touching or hovering over the sensor panel at the time of the boot-up scan. However, as illustrated in FIG. 6*c*, if a finger or other object was touching or hovering over the sensor panel during boot-up, captured raw baseline 608 will have erroneously higher values as compared to correct raw baseline 600. As a result, when offsets are computed and subtracted from erroneous raw baseline 608, an erroneous normalized baseline 610 will be produced. When the finger or other object is removed, the no-touch sensor values will appear as a negative curve (a so-called "negative finger") 612, as shown in FIG. 6*d*.

One conventional solution to this problem is to perform a "minimum-increment baseline adaptation" process which periodically scans for the minimum sensor values and updates the raw baseline to reflect any newly obtained minimum sensor values. Accordingly, if a finger or other object was initially present during the boot-up scan and an erroneously high raw baseline was obtained, when the finger or other object is removed, a subsequent scan is performed and some sensor output values drop, those lower output values become the new raw baseline values for the affected sensors. However, due to expected but unpredictable fluctuations in the sensor readings, the raw baselines are occasionally incremented by a fixed amount so that the raw baseline does not become artificially low due to the fluctuations. The approach tends to track the bottom of the analog channel noise envelope. One problem with this approach is that a finger or other object initially present during the boot-up scan will corrupt the raw baseline and therefore the sensor readings until the finger or other object is removed and a new raw baseline is obtained.

Figure 7:
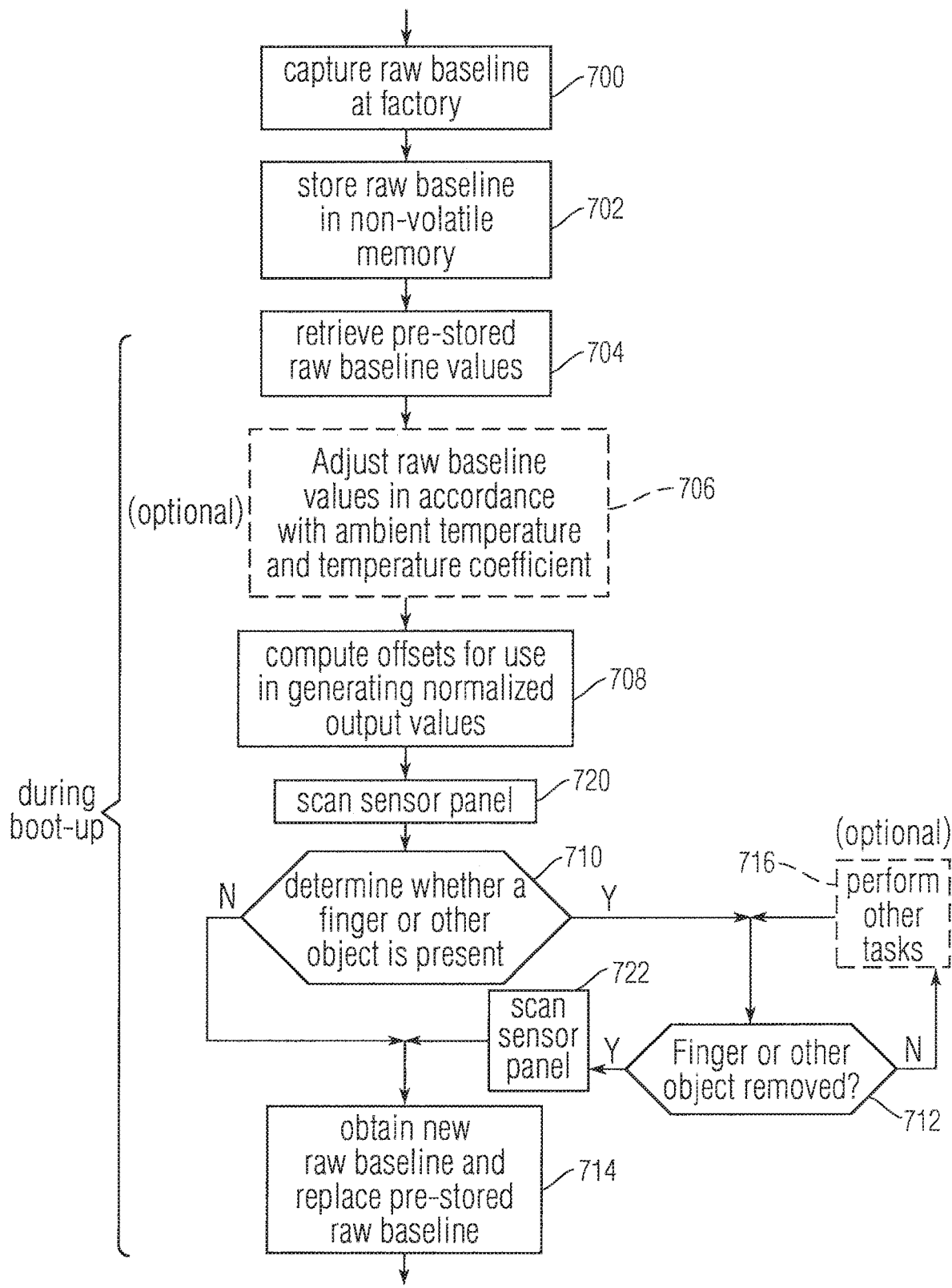
FIG. 7 is a flowchart illustrating baseline normalization according to one embodiment of this invention.

FIG. 7 is a flowchart illustrating baseline normalization according to some embodiments of the invention in which pre-stored no-touch or no-hover (no-event) sensor output values can initially be used when a sensor panel subsystem is first booted up to establish an initial baseline of sensor output values unaffected by fingers or other objects touching or hovering over the sensor panel during boot-up. By using the pre-stored baseline until the finger or other object is removed, the baseline is not initially corrupted, and the presence or absence of a finger or other object can be more easily detected. It should be understood that most of the steps of FIG. 7 can be performed by the computing system of FIG. 1, under control of baseline normalization firmware or software 140 executed in panel processor 102, and/or baseline normalization hardware 138 in panel subsystem 106.

In FIG. 7, the raw no-event baseline values for the sensor panel can be captured prior to final assembly, such as at the factory, for example, at step 700, and can be stored in non-volatile memory such as an EEPROM at step 702. During boot-up, rather than scanning the sensor panel for the raw baseline, the pre-stored raw baseline, unaffected by any finger or object that may be present, can be used at step 704. Note that the pre-stored raw baseline may have been captured at a temperature that is different from the ambient temperature during boot-up, but nevertheless any error in the pre-stored raw baseline due to temperature coefficients is expected to be small. Optionally, if ambient temperature data and a temperature coefficient is available, the factory baseline values could be adjusted for the proper temperature at 706. Offsets can then be computed so that they can be applied to subsequently received output values (after boot-up is complete) to generate normalized output values at step 708.

A scan of the sensor panel to obtain raw sensor output values can then be performed at step 720. A finger or other object can then be detected at step 710 because the raw sensor output values will be higher than the pre-stored raw baseline. Alternatively, it can be determined that there is no finger of other object present due to the appearance of relatively flat raw output values (within a predetermined range of each other), or if the output values are below some predetermined threshold or within some predetermined range of the pre-stored raw baseline. If a finger or other object is in fact detected, the process waits at step 712 until the finger of other object has been removed, and the values appear flat and/or fall below the threshold or within the predetermined range of the pre-stored raw baseline. When it has been determined that no finger or other object is present, a new scan of the sensor panel can be performed at step 722, and a new baseline can be obtained and the pre-stored raw baseline can be discarded at step 714. If no finger or other object is detected at step 710, a new baseline can be obtained and the pre-stored raw baseline can be discarded at step 714.

In some embodiments of the invention, the detection of a finger or other object at step 712 can be used at optional step 716 to initiate diagnostics modes that run internal tests on the device, or put the device into a certain operational mode. For example, suppose the sensor panel is employed in a mobile telephone, and the telephone is in a sleep mode in which the sensor panel is powered down (but not the whole telephone). When a telephone call is received, the sensor panel powers up and an "answer phone" virtual button is displayed beneath the sensor panel. If a finger or other object happens to be touching or hovering over that portion of the sensor panel covering the "answer phone" virtual button when the call is received, the user would normally have to remove the finger or other object, wait for a new raw baseline to be obtained, and then put the finger or other object back down over the sensor panel to trigger the virtual button. However, in other embodiments of the invention, if a finger or other object is detected, the "answer phone" virtual button may be automatically triggered so that the user can answer the phone without having to first lift his/her finger off and then place it back down. Other tasks can be triggered as well. For example, if a multi-event sensor panel detects a number of fingers, this may be interpreted as a sign that the user wants to type something, so a full keypad function may be activated.

Figure 8A:
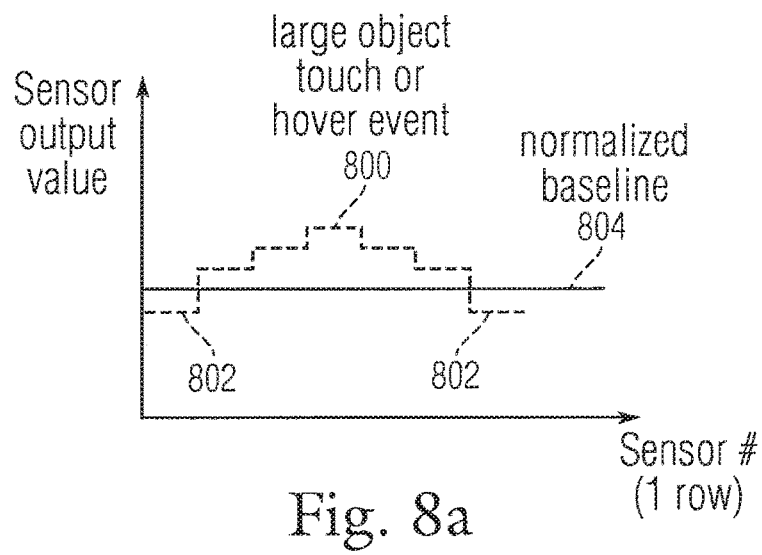
FIG. 8a illustrates the phenomenon of lowered output values for sensors located just outside a large object.

In some embodiments of the invention when a pre-stored raw baseline is not employed as described above, an enhancement to the "minimum increment baseline adaptation" process described above may be performed instead. The enhancement is based on the empirical observation that if a large object such as a palm is placed on a sensor panel, the sensor output values underneath the large object will increase as expected, but just outside the object, where there is no touching or hovering, the sensor output values will decrease. FIG. 8*a* illustrates this phenomenon. In FIG. 8*a*, a large object touch or hover event 800 causes the output values of the sensors under the large object to increase, as expected, but output values 802 of the sensors just outside the large object unexpectedly drop below normalized baseline 804. If the conventional "minimum increment baseline adaptation" process is used, the raw baseline values for these outside sensors will be artificially pushed down, and an inaccurate revised baseline will be generated.

Figure 8B:
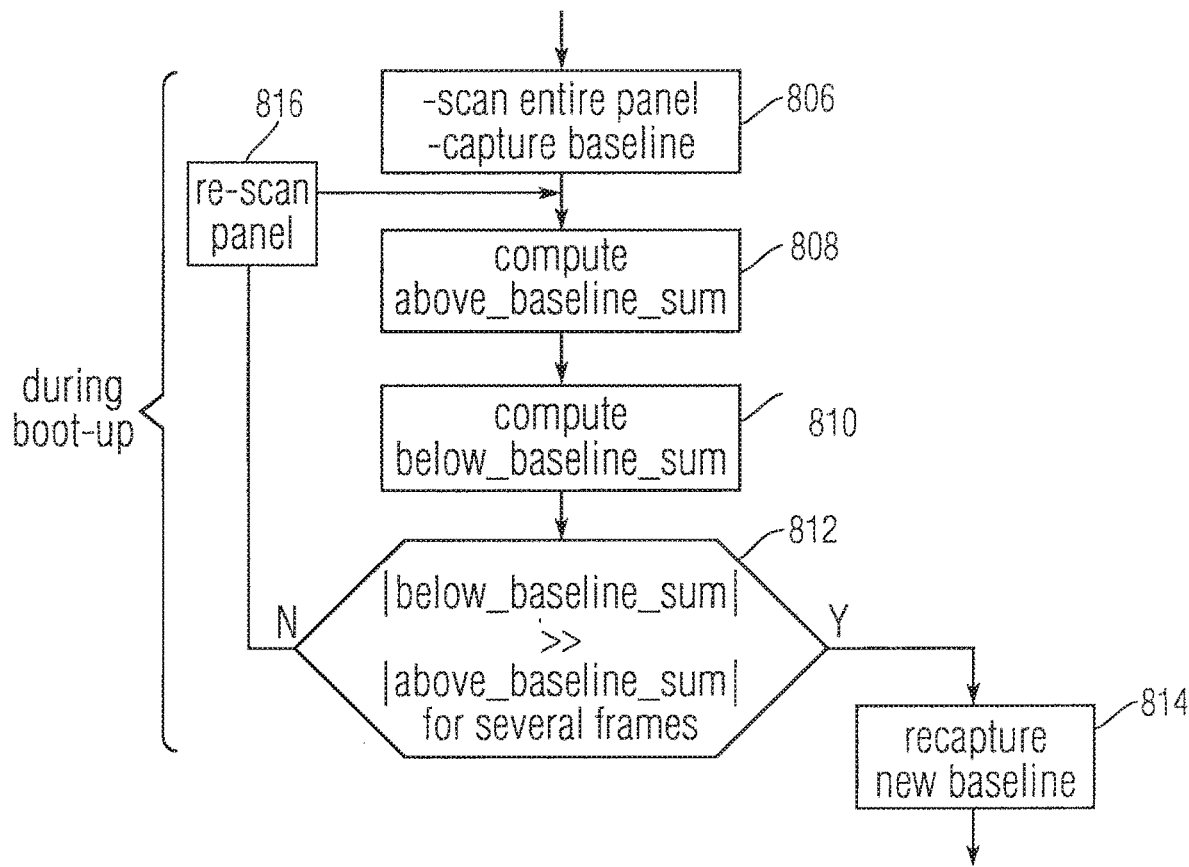
FIG. 8b illustrates a global baseline inversion detection algorithm according to one embodiment of this invention.

To overcome this problem, some embodiments of the present invention can employ a global baseline inversion detection algorithm during boot-up. In this algorithm, illustrated in FIG. 8b, a scan of the entire sensor panel is performed and a baseline is captured at step 806. In some embodiments, multiple (e.g. four) consecutive image scans can be performed, and averaged raw sensor output values can be obtained to create a baseline with extra precision to allow for more gradual adaptation. Next, the number of sensor output values in the entire image with values above the current normalized baseline value are summed (above_baseline_sum) at step 808, and the number of sensor output values below the normalized baseline are summed (below_baseline_sum) at step 810. A determination is made whether the magnitude of below_baseline_sum is much greater than the magnitude of above_baseline_sum (greater than a predetermined margin) for several frames at step 812. If this condition is not satisfied, the sensor panel is re-scanned at step 816, and steps 808, 810 and 812 are repeated. The baseline is recaptured at step 814 only when the magnitude of below_baseline_sum is >> magnitude of above_baseline_sum, and this condition persists for several consecutive frames. In one embodiment, this condition must persist for a certain number of consecutive frames (e.g. 16), and thereafter the baseline is recaptured from the next several (e.g. four) frames. It should be understood that the steps of FIG. 8b can be performed by the computing system of FIG. 1, under control of baseline normalization firmware of software 140 executed in panel processor 102, and/or baseline normalization hardware 138 in panel subsystem 106.

When a palm or other large object is present, the captured sensor output values will be high for the sensors underneath the large object and low for the outside sensors, and an erroneous baseline will be captured. As long as the palm or other large object is present, because the erroneous baseline is being used, the values for above_baseline_sum and below_baseline_sum will both be small, the equation of step 812 will not be satisfied, and no new baseline will be captured. As a result, the baseline values for the sensors outside the large object will not be pushed down to an artificially low level. When the palm or other large object is removed, all output values will return to the correct baseline. In other words, the output values for the sensors that were underneath the large object will drop, and the output values for the sensors outside the large object should rise. However, because that the captured erroneous baseline is still being used, the magnitude of below_baseline_sum will be much greater than the magnitude of above_baseline_sum. If this condition persists for a few scans, the algorithm concludes that the palm or other large object has definitively been removed, and a new baseline can be captured at 814.

Figure 8C:
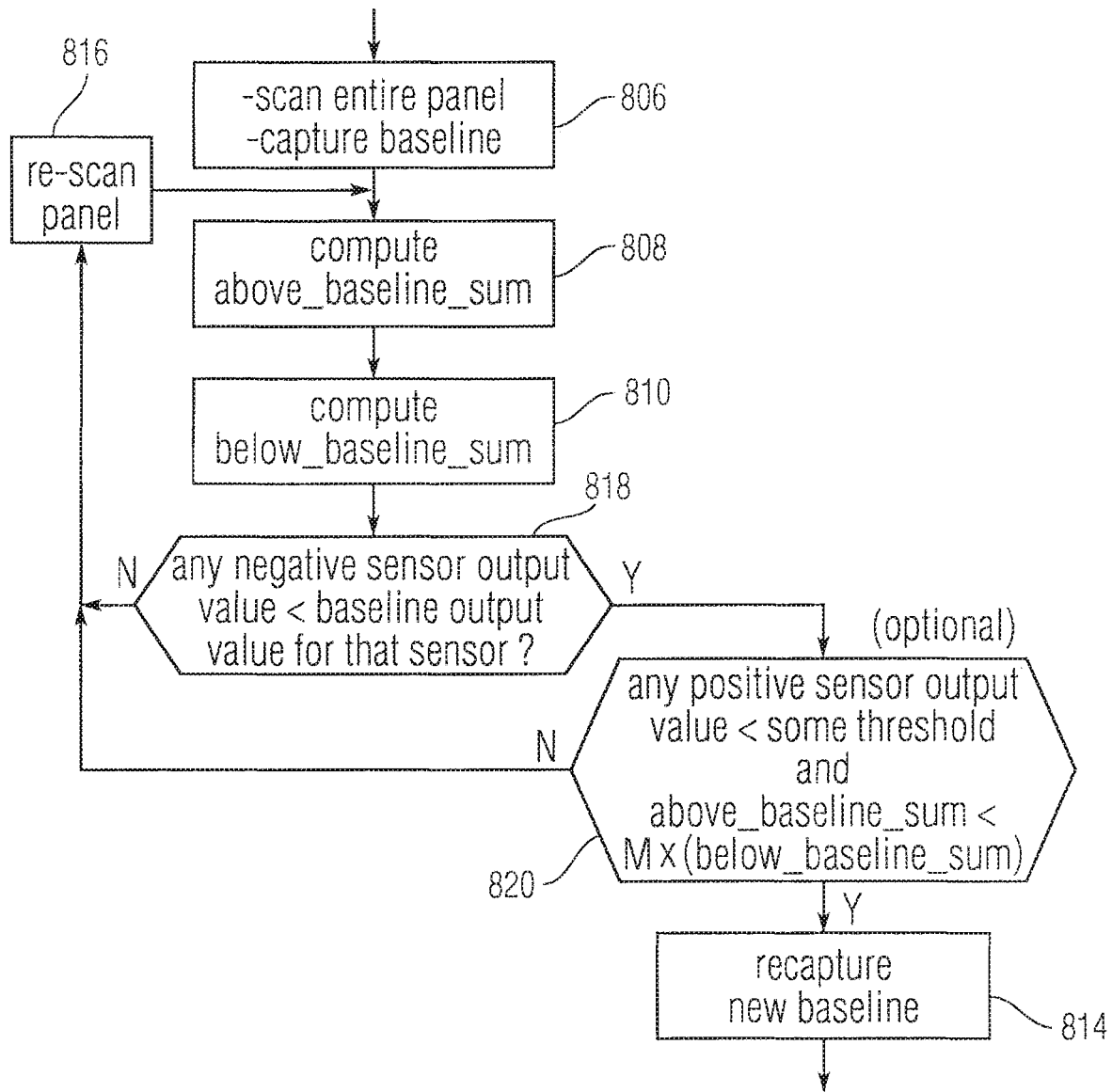
FIG. 8c illustrates a modified global baseline inversion detection algorithm according to one embodiment of this invention.

Detecting baseline inversion as described above using above_baseline_sum and below_baseline_sum may be sufficient to recover from whole fingers on the surface during original baseline capture. However, it may not trigger a recapture from partial fingers that were along an edge, or from non-grounded conductors like coins and keys that produce a mix of negative and positive sensor output values. To handle these cases, in some embodiments the global baseline inversion detection algorithm can be modified to trigger recapture based on the detection of isolated, slightly below baseline sensor output values even in the presence of many weakly positive sensor output values. As illustrated in FIG. 8c, to prevent background noise from spuriously triggering such recaptures, the negative sensor output value for any sensor may be required to be below the baseline output value for that sensor by some amount N (see step 818), where N may be chosen with sufficient margin to avoid triggering caused by a background noise standard deviation, such as four or five standard deviations of pixel or background noise below the baseline output value for that sensor. (Note that the peak pixel threshold for starting a watershed patch (i.e. starting the tracking of a touch event) is also about 4-5 standard deviations of background noise above the baseline output value for that sensor). Note that step 818 may be performed at any time.

In addition, the modified algorithm can optionally require that any individual positive touch sensor output values be limited to not more than some threshold level, such as a particular level representative of hover strength (i.e., positive sensor output values caused by a fingertip hovering over the surface within the near-field detection capabilities of the touch sensor, which are generally weaker than the touch threshold), and additionally that the sum of above baseline sensor output values does not exceed M times the sum of below baseline sensor output values (see step 820), where M may be eight, for example. These conditions effectively prevent baseline recapture from slightly negative sensor output values during a finger touch.

Water and other conductive solutions can cause negative image perturbations with no positive component. These wholly negative sensor output value regions can trigger a recapture due to the global baseline inversion detection algorithm described above. As the solution dries off, wholly positive, false sensor output value patches that are indistinguishable from objects hovering within the near-field detection capabilities of the touch sensor) may be left over. However, these false patches may have no negative sensor output values to trigger a recapture. Therefore, in some embodiments of this invention, the global baseline inversion detection algorithm of either FIG. 8b or 8c can be further modified to include a timeout rule, which provides that any unexpectedly sustained (e.g. for 10 seconds) positive patches (i.e. patches that appear to be caused by a finger hovering within the near-field detection capabilities of a touch sensor) trigger a recapture. Users are unlikely to intentionally sustain a finger hover within the near-field detection capabilities of a touch sensor in the same spot for more than a few seconds, so this rule should not have a noticeable impact on user experience. This modification can also act as a fail-safe if periodic baseline adjustments (described below) fail to keep up with a particularly severe temperature ramp. Note that the detection of a hover event within the near-field detection capabilities of a touch sensor should not trigger a recapture when optical proximity is also detected (e.g. when a separate proximity sensor detects the presence of a user's head), otherwise the optical baseline could get reset within 10 seconds as well. Thus, the sustained hover rule can be applied only when optical proximity is not above its detection threshold. This can lessen the likelihood that hovering ears and cheeks will be erased by a timeout recapture.

Figure 8D:
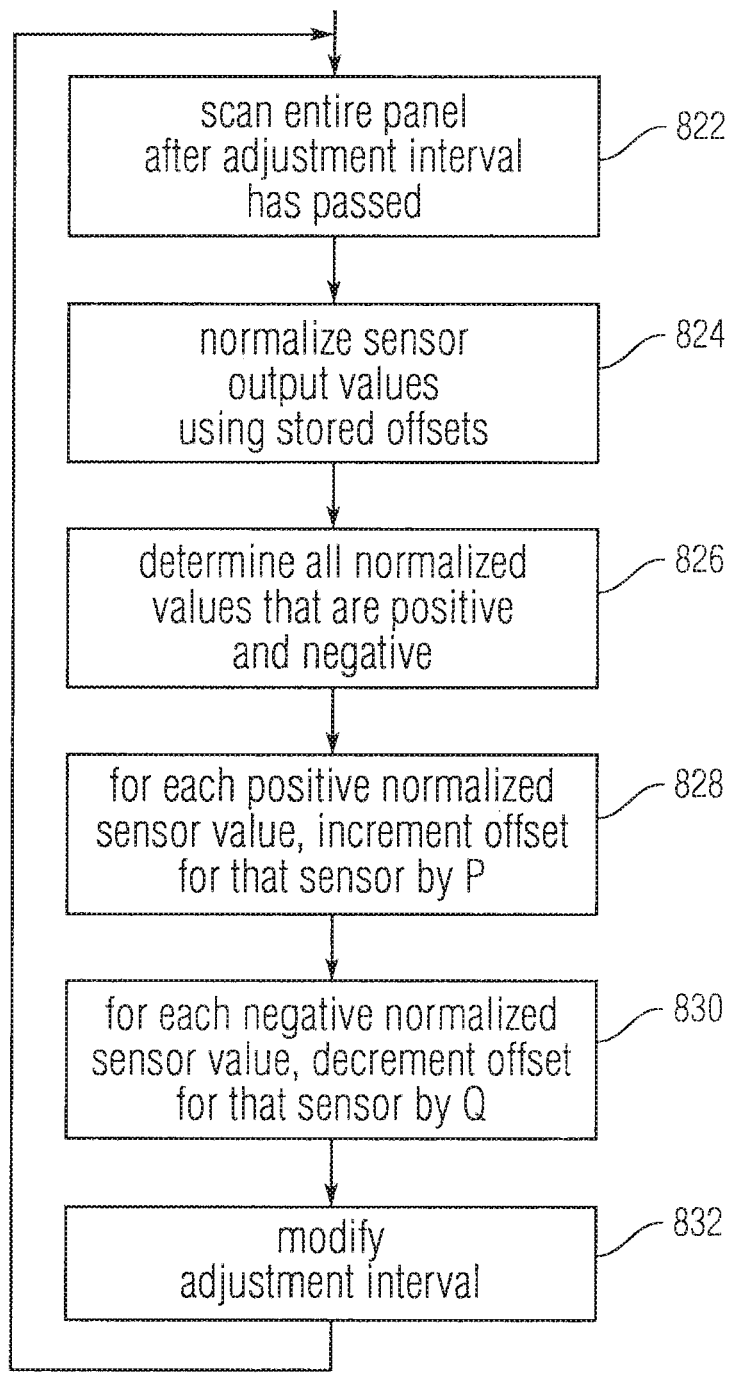
FIG. 8d illustrates an exemplary periodic baseline adjustment algorithm according to one embodiment of this invention.

FIG. 8d illustrates an exemplary periodic baseline adjustment algorithm according to some embodiments of this invention. The periodic baseline adjustment algorithm can increment or decrement individual baseline sensor output values by one count or unit, or some small value. This periodic baseline adjustment algorithm can be implemented independent of any other baseline algorithm described above. One purpose of this adjustment mode is to provide periodic fine-tuning of the baseline to track temperature drift.

To perform periodic baseline adjustment, at step 822 a scan of the sensor panel is performed after a dynamic adjustment time interval has passed. This time interval is generally much longer than the frame rate (the time it takes to scan the entire sensor panel one time). Previously computed offset values are subtracted from the sensor output values to normalize them at step 824, and all normalized sensor output values that are positive and negative are identified at step 826. For any normalized sensor values that are positive, the offset values are incremented by P at step 828, where P may be one count, or a small value, or a percentage of the positive value. For any normalized sensor values that are negative, the offset values are decremented by Q at step 830, where Q may be one count, or a small value, or a percentage of the negative value. The adjustment interval may be modified at step 832, and then the algorithm waits the duration of the adjustment period before scanning the panel again at step 822.

The adjustment interval can vary. Dynamic adjustment intervals allow quick recovery for slight baseline inversions (e.g. heating on columns w/negative temperature coefficient) without adapting out far-field or touch objects very quickly. Adjustment intervals can depend on an average of background (non-patch) sensor output values (similar to far-field measurement but linear), computed on a periodic basis than is generally much faster then the adjustment interval. This background average represents the average sensor output values in non-touch or non-hover areas (i.e. outside of "patch" areas apparently caused by touch or hover events). One exemplary algorithm for modifying the adjustment interval in step 832 is as follows, although it should be clearly understood that the values listed therein are for purposes of illustration only, and other values can be used in accordance with the invention:

```
If background average negative
    adjust interval = 250ms (handles fast warm-up);
else if background average took > 1 second to drift positive
    adjust interval = 1 second (to handle fast cool-down);
else if background average neutral or suddenly positive
    if Small Hover detected in previous frame
        adjust interval = 8 seconds,
    else if Finger Touch detected in previous frame
        adjust interval = 256 seconds,
    else
        adjust interval = 4 seconds (default).
```

If the background average is negative, this can be an indication that the sensor panel is warming up quickly, and thus the adjustment interval can be set to a first interval, such as 250 ms. If the background average took more than a second interval (larger than the first interval), such as one second, to drift positive, this can be an indication of a fast sensor panel cool-down, and thus the adjustment interval can be set to that second interval. If the background average took less than the second interval to drift positive, this can be an indication of a large object. If the background average is neutral or suddenly positive (e.g. drifted positive in less than the second interval), then if a small hover was previously detected, indicating a possible upcoming touch event, the adjustment interval can be set to a fourth interval which is longer than the second interval. If a finger touch was previously detected, indicating the likelihood of multiple touch events in the near future, the adjustment interval can be set to a fifth interval which is longer than the fourth interval. If neither event was dictated, the adjustment interval can be set to a third interval, which is between the second and fourth intervals in duration. In some embodiments, to be considered negative, the background average can be about one standard deviation of background noise below neutral. To be considered positive it can be greater than about 2 standard deviations of background noise above neutral.

Figure 9A:
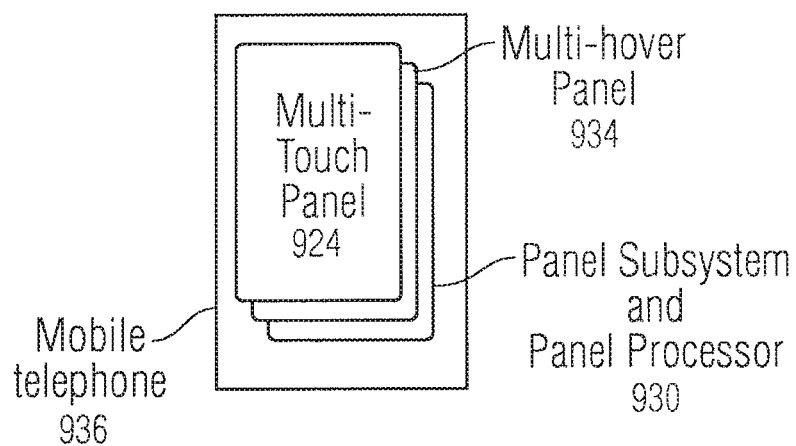
FIG. 9a illustrates an exemplary mobile telephone that can include a multi-touch panel and/or a multi-hover panel, and a panel processor configured for implementing baseline normalization or global baseline inversion detection according to one embodiment of this invention.
Figure 9B:
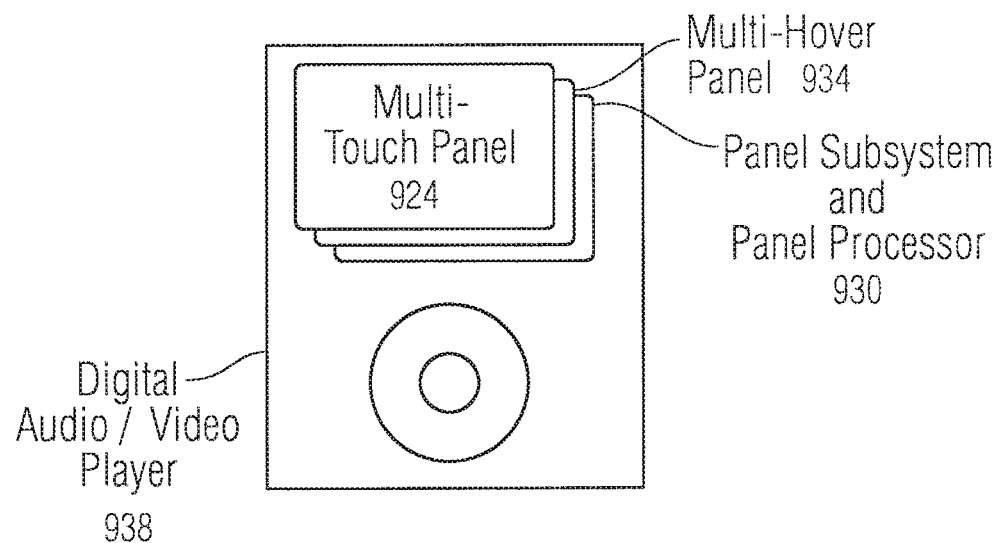
FIG. 9b illustrates exemplary digital audio/video player that can include a multi-touch panel and/or a multi-hover panel and a panel processor configured for implementing baseline normalization or global baseline inversion detection according to one embodiment of this invention.

FIG. 9a illustrates an exemplary mobile telephone 936 that may include multi-touch panel 924 and/or multi-hover panel 934, and panel subsystem and panel processor 930 configured for implementing baseline normalization or global baseline inversion detection as described above according to embodiments of the invention. FIG. 9b illustrates an exemplary digital audio/video player 938 that may include multi-touch panel 924 and/or multi-hover panel 934 and panel subsystem and panel processor 930 configured for implementing baseline normalization or global baseline inversion detection as described above according to embodiments of the invention. The mobile telephone and digital audio/video player of FIGS. 9a and 9b can advantageously benefit from baseline normalization or global baseline inversion detection because without it, fingers or other objects present on or over the sensor panel during boot-up can cause erroneous baselines to be computed, which can further cause errors in the detection of touch or hover events on the sensor panel and inconsistent or erroneous triggering of virtual buttons.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method of operating an event sensor panel, comprising:
    turning on the event sensor panel;
    normalizing the event sensor panel;
    determining one or more objects touching or hovering over the event sensor panel during the normalization of the event sensor panel; and
    initiating an operation based on the determined one or more touching or hovering objects.

2. The method of claim 1, further comprising:
    determining an image being displayed by a touch screen comprising the event sensor panel when the one or more touching or hovering objects are determined; and
    initiating the operation based on the determined image.

3. The method of claim 2, further comprising:
    determining the image being displayed at a location of the determined one or more touching or hovering objects; and
    initiating the operation based on the image being displayed at the location of the determined one or more touching or hovering objects.

4. The method of claim 1, further comprising initiating the operation based on a number of determined touching or hovering objects.

5. The method of claim 1, the operation comprising an initiation of one or more diagnostics modes.

6. The method of claim 1, further comprising turning on the event sensor panel when the event sensor panel exits a sleep mode.

7. The method of claim 1, further comprising:
    utilizing pre-stored no-event baseline sensor output values as current no-event baseline sensor output values for sensors in the event sensor panel;

performing a scan of the event sensor panel to obtain new sensor output values and determine the one or more objects touching or hovering over the event sensor panel, and replacing the current no-event baseline sensor output values with the new sensor output values upon determining that the one or more objects are no longer touching or hovering over the event sensor panel.

8. The method of claim 7, further comprising adjusting the pre-stored no-event baseline sensor output values in accordance with an ambient temperature.

9. The method of claim 7, further comprising determining whether the one or more objects are touching or hovering over the event sensor panel by:
comparing the new sensor output values to the pre-stored no-event baseline sensor output values; and
determining whether the new sensor output values are within a predetermined range of the pre-stored no-event baseline sensor output values.

10. The method of claim 7, further comprising determining whether the one or more objects are touching or hovering over the event sensor panel by determining whether the new sensor output values are below a predetermined threshold.

11. The method of claim 7, further comprising determining whether the one or more objects are touching or hovering over the event sensor panel by determining whether the new sensor output values are within a predetermined range of each other.

12. The method of claim 1, further comprising:
after the normalization of the event sensor panel, performing a scan of the event sensor panel to obtain sensor output values and determine whether additional one or more objects are touching or hovering over the event sensor panel.

13. A non-transitory computer-readable storage medium comprising program code for operating an event sensor panel, the program code for causing performance of a method comprising:
turning on the event sensor panel;
normalizing the event sensor panel;
determining one or more objects touching or hovering over the event sensor panel during the normalization of the event sensor panel; and
initiating an operation based on the determined one or more touching or hovering objects.

14. The non-transitory computer-readable storage medium of claim 13, the method further comprising:
determining an image being displayed by a touch screen comprising the event sensor panel when the one or more touching or hovering objects are determined; and
initiating the operation based on the determined image.

15. The non-transitory computer-readable storage medium of claim 14, the method further comprising:
determining the image being displayed at a location of the determined one or more touching or hovering objects; and
initiating the operation based on the image being displayed at the location of the determined one or more touching or hovering objects.

16. The non-transitory computer-readable storage medium of claim 13, the method further comprising initiating the operation based on a number of determined touching or hovering objects.

17. The non-transitory computer-readable storage medium of claim 13, the operation comprising an initiation of one or more diagnostics modes.

18. The non-transitory computer-readable storage medium of claim 13, the method further comprising turning on the event sensor panel when the event sensor panel exits a sleep mode.

19. The non-transitory computer-readable storage medium of claim 13, the method further comprising:
utilizing pre-stored no-event baseline sensor output values as current no-event baseline sensor output values for sensors in the event sensor panel;
performing a scan of the event sensor panel to obtain new sensor output values and determine the one or more objects touching or hovering over the event sensor panel, and
replacing the current no-event baseline sensor output values with the new sensor output values upon determining that the one or more objects are no longer touching or hovering over the event sensor panel.

20. The non-transitory computer-readable storage medium of claim 19, the method further comprising adjusting the pre-stored no-event baseline sensor output values in accordance with an ambient temperature.

21. The non-transitory computer-readable storage medium of claim 19, the method further comprising determining whether the one or more objects are touching or hovering over the event sensor panel by:
comparing the new sensor output values to the pre-stored no-event baseline sensor output values; and
determining whether the new sensor output values are within a predetermined range of the pre-stored no-event baseline sensor output values.

22. The non-transitory computer-readable storage medium of claim 19, the method further comprising determining whether the one or more objects are touching or hovering over the event sensor panel by determining whether the new sensor output values are below a predetermined threshold.

23. The non-transitory computer-readable storage medium of claim 19, the method further comprising determining whether the one or more objects are touching or hovering over the event sensor panel by determining whether the new sensor output values are within a predetermined range of each other.

24. The non-transitory computer-readable storage medium of claim 13, the method further comprising:
after the normalization of the event sensor panel, performing a scan of the event sensor panel to obtain sensor output values and determine whether additional one or more objects are touching or hovering over the event sensor panel.

25. An event sensing system, comprising:
an event sensor panel; and
a processor operatively coupled to the event sensor panel and capable of
turning on the event sensor panel,
normalizing the event sensor panel;
determining one or more objects touching or hovering over the event sensor panel during the normalization of the event sensor panel, and
initiating an operation based on the determined one or more touching or hovering objects.

26. The event sensing system of claim 25, the processor further capable of:
determining an image being displayed by a touch screen comprising the event sensor panel at a location of the determined one or more touching or hovering objects when the one or more touching or hovering objects are determined; and initiating the operation based on the image being displayed at the location of the determined one or more touching or hovering objects.

27. The event sensing system of claim 25, the processor further capable of initiating the operation based on a number of determined touching or hovering objects.

28. The event sensing of claim 25, the processor further capable of:
    after the normalization of the event sensor panel, performing a scan of the event sensor panel to obtain sensor output values and determine whether additional one or more objects are touching or hovering over the event sensor panel.

* * * * *

UNITED STATES PATENT AND TRADEMARK OFFICE
CERTIFICATE OF CORRECTION

PATENT NO. : 10,761,658 B2  Page 1 of 1
APPLICATION NO. : 15/070982
DATED : September 1, 2020
INVENTOR(S) : Brian Richards Land et al.

It is certified that error appears in the above-identified patent and that said Letters Patent is hereby corrected as shown below:

In the Claims

In Column 21, Line 7, in Claim 28, after "sensing" insert -- system --.

Signed and Sealed this
Seventeenth Day of November, 2020

Andrei Iancu
*Director of the United States Patent and Trademark Office*